W. L. WHITEHEAD.
SCRUBBING APPARATUS.
APPLICATION FILED MAR. 9, 1912.
1,033,222.
Patented July 23, 1912.
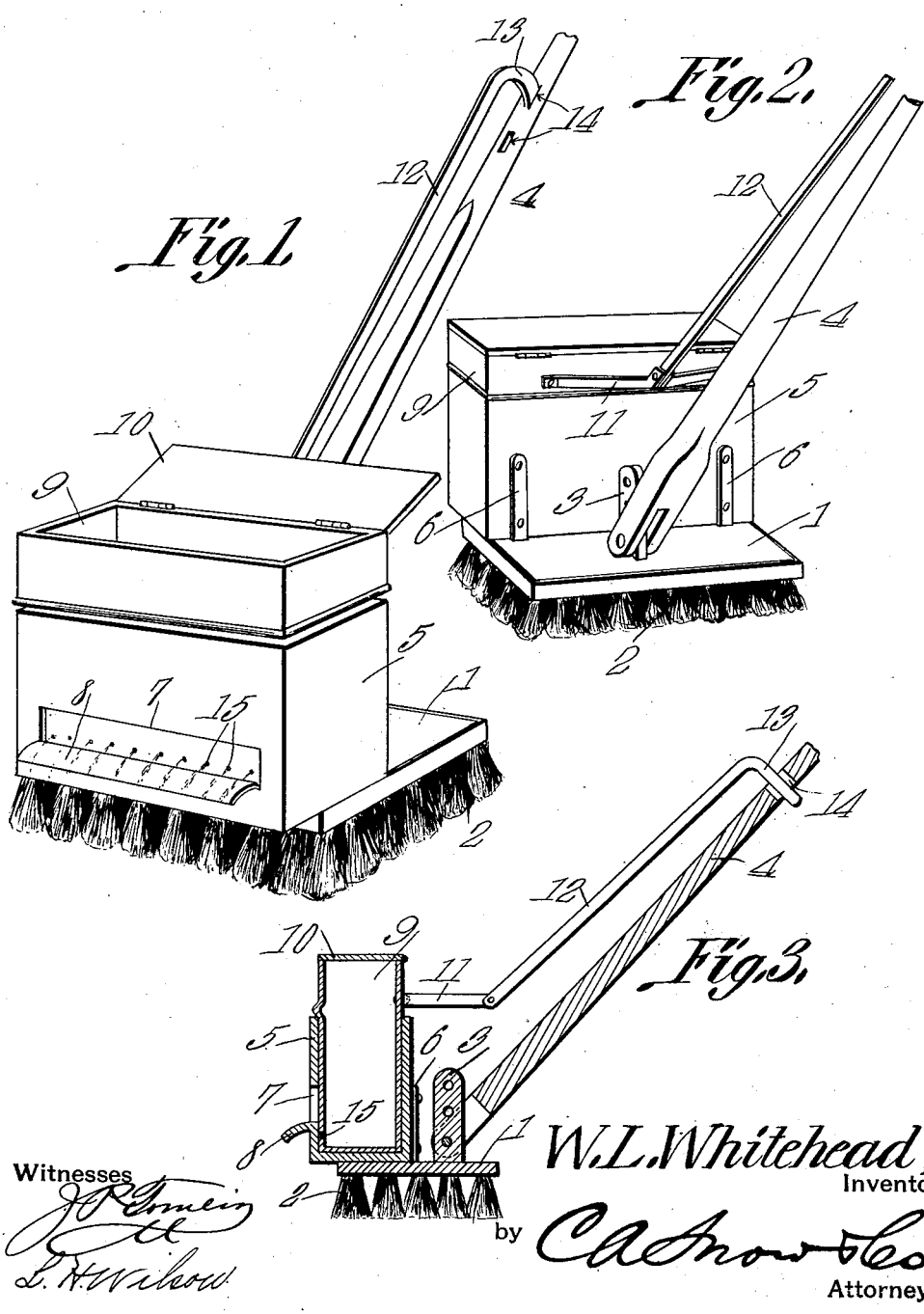
W. L. Whitehead,
Inventor
Witnesses
by C. A. Snow & Co.
Attorneys

UNITED STATES PATENT OFFICE.

WILLIAM L. WHITEHEAD, OF FULTON, MISSISSIPPI.

SCRUBBING APPARATUS.

1,033,222.

Specification of Letters Patent.

Patented July 23, 1912.

Application filed March 9, 1912. Serial No. 682,659.

*To all whom it may concern:*

Be it known that I, WILLIAM L. WHITEHEAD, a citizen of the United States, residing at Fulton, in the county of Itawamba and State of Mississippi, have invented a new and useful Scrubbing Apparatus, of which the following is a specification.

This invention relates to apparatus for scrubbing floors and the like, its principal object being to provide, in connection with the ordinary floor engaging structure, a water container having means, under the control of the operator, whereby jets of water can be directed onto the floor beyond the floor engaging element, the discharge of the fluid being readily controlled.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings the preferred form of the invention has been shown.

In said drawings:—Figure 1 is a perspective view of the apparatus, the parts being adjusted to permit the escape of water in jets therefrom. Fig. 2 is another perspective view of the apparatus, the parts being shown in their normal positions and with the supply of water cut off. Fig. 3 is a vertical section through the apparatus with the parts in the positions shown in Fig. 2.

Referring to the figures by characters of reference 1 designates the head of the scrubbing element, the floor engaging devices 2 being in the form of bristles, cloths, or any other suitable material. A standard 3 extends from the top and has a handle 4 adjustably connected to it, said handle being adapted to swing relative to the standard. A tank 5 is mounted on the front portion of the head 1 and extends forwardly therebeyond, said tank being held to the head by means of braces 6 or the like. An opening 7 is formed in the front face of the tank by cutting a lip 8 therefrom, said lip being extended forwardly and outwardly from the lower edge of the opening as clearly shown in Fig. 1.

A receptacle 9 is slidably mounted within the tank 5 and fits snugly therein, the upper end of the receptacle being adapted to overhang the upper end of the tank and being provided with a hinged cover 10. A bracket 11 extends rearwardly from the upper portion of the receptacle 9 and is pivotally connected to an actuating rod 12 having a hooked end 13 adapted to be inserted into any one of a series of openings 14 formed in the handle 4.

A series of openings 15 is formed in the receptacle 9 close to the bottom thereof and these openings are normally closed by that portion of the front wall of tank 5 located below the opening 7. It will be apparent, therefore, that under normal conditions water contained within the receptacle 9 cannot escape through the openings 15 because these openings are closed, as shown in Fig. 3. When, however, it is desired to permit water to escape through the openings 15, the operator pulls upwardly on the rod 12, thereby elevating receptacle 9 within the tank 5 and bringing the openings 15 into position back of the opening 7. Water will then escape in jets through the openings 15 and over lip 8 and will be discharged onto the surface to be scrubbed.

The receptacle 9 can be supported in elevated position by inserting the hooked end 13 of handle 12 into the upper opening 14 in the handle 4.

While the water is discharging from the receptacle, the scrubbing element can be reciprocated upon the surface to be cleaned. As soon as sufficient water has been discharged, hook 13 can be disengaged from handle 4 whereupon receptacle 9 will gravitate to its normal position and the openings 15 will be brought back of the front wall of tank 5 will be closed thereby.

What is claimed is:—

1. Scrubbing apparatus including a floor engaging structure, a tank thereon, said tank having an outlet opening, a receptacle movably mounted within the tank and having an outlet opening normally closed by one wall of the tank, and means for shifting the receptacle within the tank to expose the first mentioned outlet opening through the opening in the tank.

2. Scrubbing apparatus including a floor engaging structure, a tank mounted thereon and having an opening in one wall, a receptacle slidably mounted within the tank and having an outlet opening normally closed by said wall, a handle connected to the floor engaging structure, and means adjacent to and adapted to engage the handle for elevating and supporting the receptacle with its outlet opening exposed within the opening in the tank.

3. Scrubbing apparatus including a floor engaging structure, a handle extending therefrom, a tank mounted on said structure and having an outlet opening in one wall, a receptacle slidably mounted within the tank and having a series of outlet apertures normally closed by said wall, means for shifting the receptacle within the tank to expose the outlet apertures of the receptacles within the opening in the tank, and coöperating means upon the handle and said shifting means for supporting the receptacle in shifted position.

4. Scrubbing apparatus including a floor engaging structure, a tank thereon, said tank having an aperture in one wall, a lip extending from the lower wall of the opening, a receptacle slidably mounted within the tank and having a plurality of outlet openings normally closed by said apertured wall, and means for elevating the receptacle within the tank to expose said outlet openings within the aperture in the tank.

5. Scrubbing apparatus including a floor engaging structure, a tank thereon, said tank having an aperture in one wall, a lip extending from the lower wall of the opening, a receptacle slidably mounted within the tank and having a plurality of outlet openings normally closed by said apertured wall, means for elevating the receptacle within the tank to expose said outlet openings within the aperture in the tank, and means for supporting the receptacle in elevated position.

In testimony that I claim the foregoing as my own, I have hereto affixed my signature in the presence of two witnesses.

WILLIAM L. ✕ WHITEHEAD.
his mark

Witnesses:
M. C. BENSON,
A. D. GRAHAM.